United States Patent
Ho et al.

(10) Patent No.: US 10,177,558 B1
(45) Date of Patent: Jan. 8, 2019

(54) OVERVOLTAGE PROTECTION METHOD AND BUCK SWITCHING REGULATOR HAVING OVERVOLTAGE PROTECTION FUNCTION AND CONTROL CIRCUIT THEREOF

(71) Applicant: RICHTEK TECHNOLOGY CORPORATION, Zhubei, Hsinchu (TW)

(72) Inventors: Jyun-Che Ho, Chiayi (TW); Jo-Yu Wang, Hsinchu (TW); Isaac Y. Chen, Hsinchu (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 15/909,313

(22) Filed: Mar. 1, 2018

(30) Foreign Application Priority Data

Jun. 26, 2017 (TW) .............................. 106121207 A

(51) Int. Cl.
| | |
|---|---|
| *H02M 3/20* | (2006.01) |
| *H02H 3/20* | (2006.01) |
| *H02M 3/158* | (2006.01) |
| *G05F 1/62* | (2006.01) |
| *G05F 5/00* | (2006.01) |
| *H02M 1/00* | (2006.01) |

(52) U.S. Cl.
CPC ............... *H02H 3/202* (2013.01); *G05F 1/62* (2013.01); *H02M 3/158* (2013.01); *G05F 5/00* (2013.01); *H02M 2001/0003* (2013.01)

(58) Field of Classification Search
CPC .... H02M 3/156; H02M 3/158; H02M 3/1588; H02M 2003/1566; H02M 3/155; H02M 3/1582; H02M 2003/1557; H02M 3/157; H04B 2215/069
See application file for complete search history.

(56) References Cited

U.S. PATENT DOCUMENTS

2008/0231247 A1* 9/2008 Uehara ................. H02M 3/158 323/284

\* cited by examiner

*Primary Examiner* — Adolf Berhane
*Assistant Examiner* — Afework Demisse
(74) *Attorney, Agent, or Firm* — Tung & Associates

(57) ABSTRACT

A buck switching regulator includes: a power stage, which includes: an upper-gate switch, a lower-gate switch and an inductor, connected with one another at a switching node; and a supply control switch, controlling the power supply form an output terminal to a load. An overvoltage protection method includes the following steps: (A) sensing a voltage of the switching node, to obtain a switching node voltage; (B) determining whether an overvoltage event occurs in the switching node voltage; and (C) if it is determined yes in the step (B), outputting a protection signal. An overvoltage event is determined directly according to the switching node voltage, not directly according to the output voltage.

10 Claims, 3 Drawing Sheets

OVERVOLTAGE PROTECTION METHOD AND BUCK SWITCHING REGULATOR HAVING OVERVOLTAGE PROTECTION FUNCTION AND CONTROL CIRCUIT THEREOF

CROSS REFERENCE

The present invention claims priority to TW 106121207 filed on Jun. 26, 2017.

BACKGROUND OF THE INVENTION

Field of Invention

The present invention relates to an overvoltage protection method, and a buck switching regulator having overvoltage protection function and a control circuit thereof; particularly, it relates to such overvoltage protection method and such buck switching regulator having overvoltage protection function and such control circuit capable of fulfilling overvoltage protection according to a switching node voltage.

Description of Related Art

Please refer to FIG. 1, which shows a schematic diagram of a conventional buck switching regulator. A power stage 11 of the conventional buck switching regulator 10 comprises an upper-gate switch U1, a lower-gate switch L1 and an inductor L, which are all electrically connected to a switching node LX. An upper-gate operation signal UG and a lower-gate operation signal LG alternatively turn ON and turn OFF the upper-gate switch U1 and the lower-gate switch L1 respectively, such that power is delivered from an input terminal IN to an output terminal OUT. The output terminal OUT for example is connected to a load 13 (the load 13 can be, for example, a battery). In this conventional buck switching regulator 10, a supply control switch M1 can be provided between the output terminal OUT and the load 13, and the supply control switch M1 is controlled by a supply control signal PGP.

When the conventional buck switching regulator 10 is supplying power, the upper-gate switch U1 and the lower-gate switch L1 are repeatedly turned ON and turned OFF in complementary phase, whereby power is delivered from the input terminal IN to the output terminal OUT and then supplied to the load 13.

When an abnormal short circuit event occurs on the upper-gate switch U1, the power will be continuously supplied to the output terminal OUT; the power at the output terminal OUT will be overloaded, which causes an undesirable over voltage event that is very dangerous.

To solve this problem, the conventional buck switching regulator 10 proposes a solution: Referring to FIG. 1, in the conventional buck switching regulator 10, an overvoltage sensing circuit 12 is employed to sense the output voltage VOUT and compares the sensed output voltage VOUT with a threshold, to determine whether an overvoltage event occurs in the output voltage VOUT at the output terminal OUT. If it is determined yes, this overvoltage sensing circuit 12 will trigger a coping mechanism to disable the supply control signal PGP, to thereby turn off the supply control switch M1. Consequently, overloaded power will not flow to the load 13, to avoid damaging the load 13.

Nevertheless, this conventional buck switching regulator 10 has a drawback that: it is too slow for the coping mechanism of this conventional buck switching regulator 10 to determine whether an overvoltage event occurs. Under a situation where there is a large current, a damage may have been done.

In view of the above, to overcome the drawbacks in the prior art, the present invention proposes an overvoltage protection method and a buck switching regulator having overvoltage protection function and a control circuit thereof, which is capable of providing overvoltage protection by a faster response time.

SUMMARY OF THE INVENTION

From one perspective, the present invention provides an overvoltage protection method for providing overvoltage protection to a buck switching regulator, wherein the buck switching regulator is configured to operably convert an input voltage supplied from an input terminal to an output voltage at an output terminal, the buck switching regulator comprising: a power stage, which includes: an upper-gate switch having one end electrically connected to the input terminal and another end electrically connected to a switching node, wherein the upper-gate switch is controlled by an upper-gate operation signal; a lower-gate switch having one end electrically connected to the switching node and another end electrically connected to ground, wherein the lower-gate switch is controlled by a lower-gate operation signal; and an inductor having one end electrically connected to the switching node and another end electrically connected to the output terminal; and a supply control switch, which is configured to operably control transmission of power from the output terminal to a load; the overvoltage protection method comprising the following steps: (A) sensing a voltage of the switching node, to obtain a switching node voltage; (B) determining whether an overvoltage event occurs in the switching node voltage; and (C) when the step (B) determines that an overvoltage event occurs in the switching node voltage, outputting a protection signal.

In one embodiment, the step (B) includes one of the following steps (B1)-(B4): (B1) determining whether the switching node voltage is greater than a first voltage threshold and whether the lower-gate switch is turned ON by the lower-gate operation signal; or (B2) determining whether the switching node voltage is greater than the first voltage threshold and whether the upper-gate switch is turned OFF by the upper-gate operation signal; or (B3) determining whether the switching node voltage is greater than a difference between "the input voltage and a second voltage threshold" and whether the lower-gate switch is turned ON by the lower-gate operation signal; or (B4) determining whether the switching node voltage is greater than a difference between "the input voltage and the second voltage threshold" and whether the upper-gate switch is turned OFF by the upper-gate operation signal.

In one embodiment, the protection signal triggers one of or a combination of the following actions: (1) turning off the supply control switch; (2) turning off the upper-gate switch and the lower-gate switch; and/or (3) directly shutting down the buck switching regulator.

From another perspective, the present invention provides a buck switching regulator having overvoltage protection function, which is configured to operably convert an input voltage supplied from an input terminal to an output voltage at an output terminal, the buck switching regulator comprising: a power stage, which includes: an upper-gate switch having one end electrically connected to the input terminal and another end electrically connected to a switching node, wherein the upper-gate switch is controlled by an upper-gate operation signal; a lower-gate switch having one end electrically connected to the switching node and another end electrically connected to ground, wherein the lower-gate switch is controlled by a lower-gate operation signal; and an inductor having one end electrically connected to the switching node and another end electrically connected to the output terminal; a supply control switch, which is configured to operably control transmission of power from the output terminal to a load; a control signal generation circuit, which is configured to operably generate the upper-gate operation signal and the lower-gate operation signal; and an overvoltage sensing unit, which is electrically connected to the switching node and which is configured to operably sense a voltage of the switching node, to obtain a switching node voltage; wherein the overvoltage sensing unit determines whether an overvoltage event occurs in the switching node voltage, and when the overvoltage sensing unit determines that an overvoltage event occurs in the switching node voltage, the overvoltage sensing unit outputs a protection signal.

From still another perspective, the present invention provides a control circuit of a buck switching regulator having overvoltage protection function, wherein the buck switching regulator is configured to operably convert an input voltage supplied from an input terminal to an output voltage at an output terminal, the buck switching regulator comprising: a power stage, which includes: an upper-gate switch having one end electrically connected to the input terminal and another end electrically connected to a switching node, wherein the upper-gate switch is controlled by an upper-gate operation signal; a lower-gate switch having one end electrically connected to the switching node and another end electrically connected to ground, wherein the lower-gate switch is controlled by a lower-gate operation signal; and an inductor having one end electrically connected to the switching node and another end electrically connected to the output terminal; and a supply control switch, which is configured to operably control transmission of power from the output terminal to a load; the control circuit comprising: a control signal generation circuit, which is configured to operably generate the upper-gate operation signal and the lower-gate operation signal, so as to control an operation of the upper-gate switch and an operation of the lower-gate switch, respectively; and an overvoltage sensing unit, which is electrically connected to the switching node and which is configured to operably sense a voltage of the switching node, to obtain a switching node voltage; wherein the overvoltage sensing unit determines whether an overvoltage event occurs in the switching node voltage, and when the overvoltage sensing unit determines that an overvoltage event occurs in the switching node voltage, the overvoltage sensing unit outputs a protection signal.

In one embodiment, the overvoltage sensing unit includes: a comparison circuit, which is configured to operably compare the switching node voltage with a voltage threshold, to determine whether the switching node voltage is greater than the voltage threshold and output a comparison result correspondingly; and a logic unit, which is configured to operably determine whether to generate the protection signal according to the comparison result and the lower-gate operation signal or according to the comparison result and the upper-gate operation signal.

In one embodiment, the overvoltage sensing unit includes: a comparison circuit, which is configured to operably determine whether the switching node voltage is greater than a difference between "the input voltage and a voltage threshold", and output a comparison result correspondingly; and a logic unit, which is configured to operably determine whether to generate the protection signal according to the comparison result and the lower-gate operation signal or according to the comparison result and the upper-gate operation signal.

The objectives, technical details, features, and effects of the present invention will be better understood with regard to the detailed description of the embodiments below, with reference to the attached drawings.

DESCRIPTION OF THE PREFERRED EMBODIMENTS

The above and other technical details, features and effects of the present invention will be will be better understood with regard to the detailed description of the embodiments below, with reference to the drawings. The drawings as referred to throughout the description of the present invention are for illustration only, to show the interrelations between the circuits and the devices, but not drawn according to actual scale.

Figure 2:
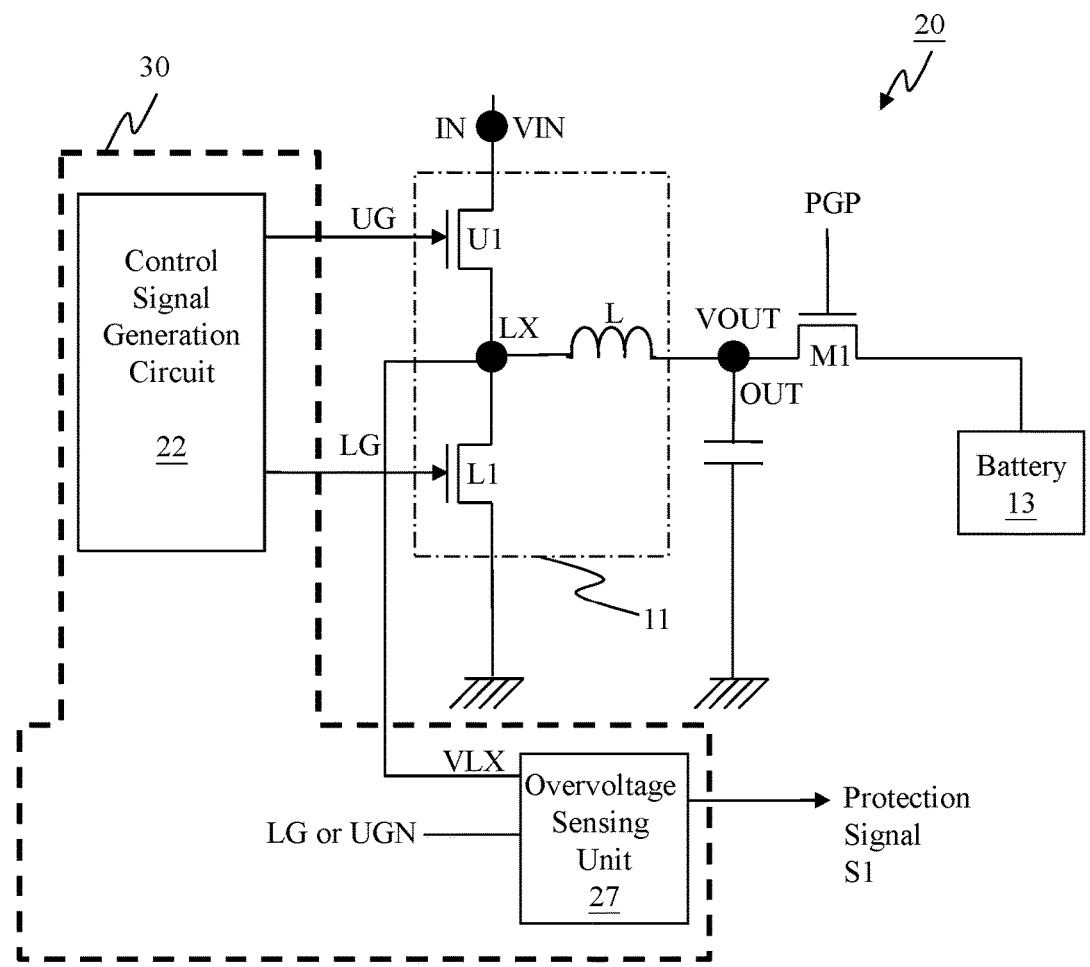
FIG. 2 shows a schematic diagram of a buck switching regulator having overvoltage protection function according to an embodiment of the present invention.

Please refer to FIG. 2, which shows a schematic diagram of a buck switching regulator having overvoltage protection function according to an embodiment of the present invention.

The buck switching regulator having overvoltage protection function 20 of this embodiment comprises: a power stage 11, a supply control switch M1, a control signal generation circuit 22 and an overvoltage sensing unit 27. In one embodiment, the control signal generation circuit 22 and the overvoltage sensing unit 27 can be (but not necessarily) packaged into one single chip. In the buck switching regulator having overvoltage protection function 20 of this embodiment, the power stage 11 includes: an upper-gate switch U1, a lower-gate switch L1 and an inductor L. The upper-gate switch U1, the lower-gate switch L1 and the inductor L are electrically connected to a switching node LX; the upper-gate switch U1 and the lower-gate switch L1 and are controlled by the control signal generation circuit 22. The upper-gate switch U1 can be, for example but not limited to, an NMOS power transistor or a PMOS power transistor. The lower-gate switch L1 can be, for example but not limited to, an NMOS power transistor or a PMOS power transistor. In this embodiment, in the exemplary illustration of FIG. 2, the upper-gate switch U1 and the lower-gate switch L1 are both shown to be NMOS power transistors. The upper-gate switch U1 has one end electrically connected to the input terminal IN and another end electrically connected to the switching node LX. The lower-gate switch L1 has one end electrically connected to the switching node LX and another end electrically connected to ground. The inductor L has one end electrically connected to the switching node LX and another end electrically connected to the output terminal OUT.

The supply control switch M1 is electrically connected between the output terminal OUT and the load 13, wherein the load 13 can be, for example but not limited to, a battery. The supply control switch M1 is configured to operably control transmission of power from the output terminal OUT to the load 13. The supply control switch M1 can be controlled by a supply control signal PGP. The supply control signal PGP for example can be generated by the control signal generation circuit 22, or by any other suitable circuit.

The control signal generation circuit 22 is configured to operably generate an upper-gate operation signal UG and a lower-gate operation signal LG, to control operations of the upper-gate switch U1 and the lower-gate switch L1 respectively. The upper-gate operation signal UG and the lower-gate switch LG alternatively turn ON and turn OFF the upper-gate switch U1 and the lower-gate switch L1 in complementary phase, so that power is delivered from the input terminal IN to the output terminal OUT.

The power at the output terminal OUT will be overloaded to cause an overvoltage event if an abnormal short circuit event occurs on the upper-gate switch U1. To solve this problem, the present invention provides a overvoltage protection method with a faster response time.

Figure 1:
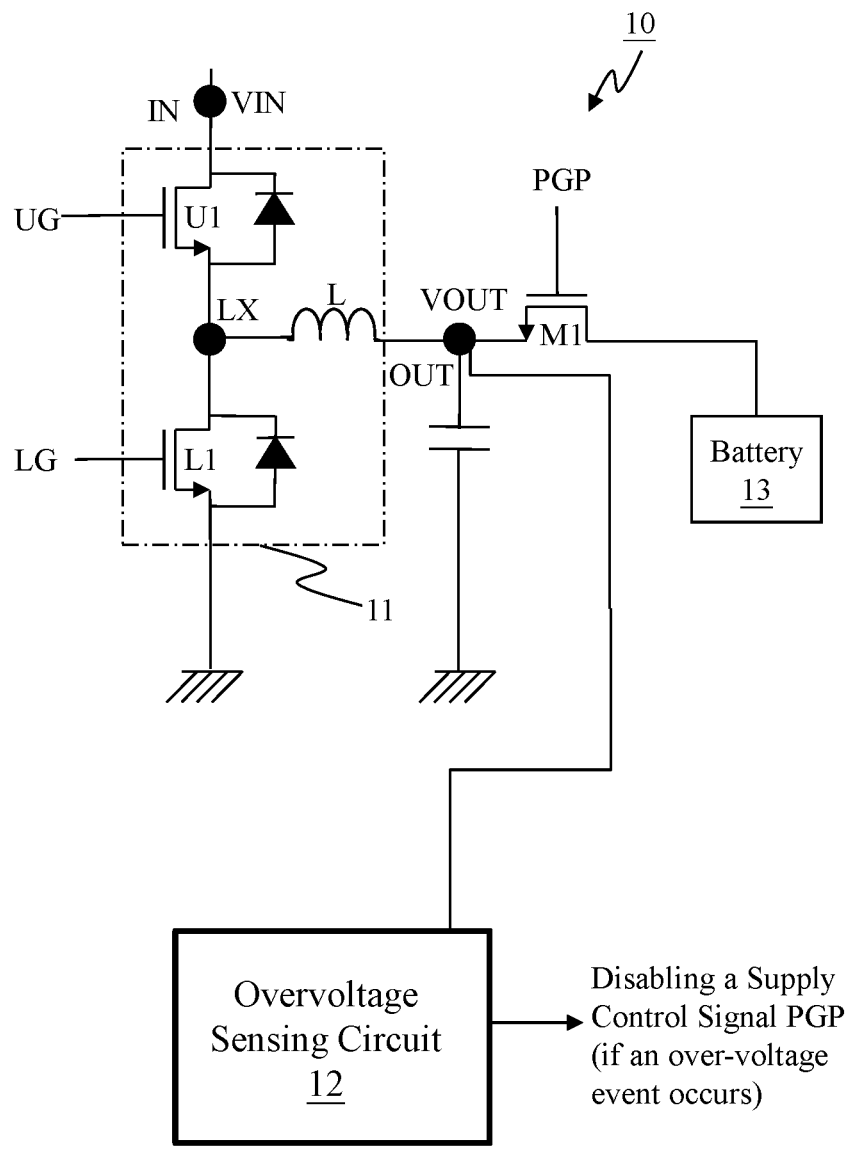
FIG. 1 shows a schematic diagram of a conventional buck switching regulator.

Please still refer to FIG. 2. In contrast to the prior art of FIG. 1 wherein whether an overvoltage event occurs in the output voltage VOUT at the output terminal OUT is determined through directly sensing the output voltage VOUT at the output terminal OUT, the overvoltage sensing unit 27 of this embodiment is electrically connected to the switching node LX. To be more specific, the overvoltage sensing unit 27 is configured to operably sense a voltage of the switching node LX, to obtain a switching node voltage VLX, and the overvoltage sensing unit 27 determines whether an abnormal short circuit event occurs on the upper-gate switch U1 according to the obtained switching node voltage VLX (in other words, whether an abnormal short circuit event occurs is determined according to whether an undesirable overvoltage event occurs in the switching node voltage VLX). If it is determined yes, in one embodiment, the overvoltage sensing unit 27 can issue a protection signal S1 (How the overvoltage sensing unit 27 determines whether an undesirable overvoltage event occurs in the switching node voltage VLX will be explained in more detail in the later description).

Once an undesirable overvoltage event has indeed occurred, in one embodiment, the protection signal S1 will initiate one of or a combination of the following actions, so that overloaded power will be prevented from flowing into the load 13, and hence the load 13 is prevented from being damaged. The actions that the protection signal S1 will initiate include one of or a combination of: (1) the protection signal S1 can turn off the supply control switch M1, so that the power delivered from the input terminal IN to the output terminal OUT will not be delivered to the load 13, to avoid damaging the load 13. Or, (2) the protection signal S1 can turn off both the upper-gate switch U1 and the lower-gate switch L1, so that the power will not be delivered from the input terminal IN to the output terminal OUT, to avoid damaging the load 13. Or, (3) the protection signal S1 can directly shut down the buck switching regulator 20, to not only avoid damaging the load 13, but also protect the buck switching regulator 20. Note that it is not limited for the protection signal S1 to initiate only one single action; the protection signal S1 can initiate two or more of the above-mentioned actions in combination.

Figure 3:
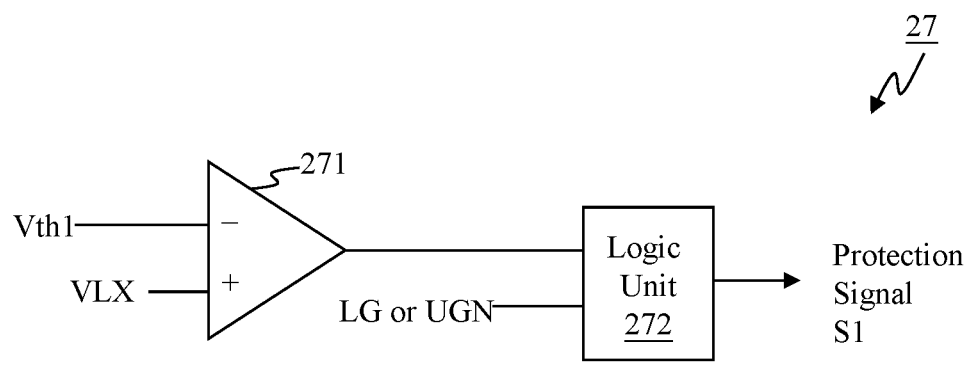
FIG. 3 shows a schematic diagram of an overvoltage sensing unit according to an embodiment of the present invention.

The following description will explain how the overvoltage sensing unit 27 determines whether an undesirable overvoltage event occurs in the switching node voltage VLX Please refer to FIG. 3, which shows a schematic diagram of an overvoltage sensing unit according to an embodiment of the present invention. The overvoltage sensing unit 27 of this embodiment includes: a comparison circuit 271 and a logic unit 272. Note that, in the present invention, the overvoltage sensing unit 27 directly senses the switching node voltage VLX to determine whether an overvoltage event occurs, which is different from the prior art which directly senses the output voltage VOUT at the output terminal OUT. In this embodiment, the comparison circuit 271 is configured to operably compare the switching node voltage VLX with a voltage threshold Vth1, to determine whether the switching node voltage VLX is greater than the voltage threshold Vth1 and output a comparison result correspondingly.

In one embodiment, when the lower-gate switch L1 is turned ON in normal operation, there is a drain-source voltage across the lower-gate switch L1. Hence, the voltage threshold Vth1 can be set to be, for example but not limited to, a voltage value which is higher than this drain-source voltage across the lower-gate switch L1.

In one embodiment, the logic unit 272 is configured to operably determine whether "the switching node voltage VLX is greater than the voltage threshold Vth1 (VLX>Vth1)" and "the lower-gate switch L1 is turned ON by the lower-gate operation signal LG (L1 is ON)" are both true according to the lower-gate operation signal LG and the comparison result outputted from the comparison circuit 271 (the comparison results shows whether VLX>Vth1). If it is determined yes (i.e., both are true), the logic unit 272 outputs the protection signal S1 accordingly.

In other words, when the lower-gate switch L1 is turned ON by the lower-gate operation signal LG under normal operation, the switching node voltage VLX should not be greater than the drain-source voltage across the lower-gate switch L1. Therefore, if "L1 is ON" and "VLX>Vth1" are both true, it indicates that an overvoltage event is occurring and there is very likely a short circuit event occurring in the upper-gate switch U1. Under such situation, the logic unit 272 should instantly output the protection signal S1.

Please still refer to FIG. 3. The logic unit 272 of this embodiment can determine whether an overvoltage event occurs according to other ways.

In another embodiment, the logic unit 272 is configured to operably determine whether "the switching node voltage VLX is greater than the voltage threshold Vth1 (VLX>Vth1)" and "the upper-gate switch U1 is turned OFF by the upper-gate operation signal UG (U1 is OFF)" are both true according to the upper-gate operation signal UG and the comparison result outputted from the comparison circuit 271 (the comparison results shows whether VLX>Vth1). If it is determined yes (i.e., both are true), the logic unit 272 outputs the protection signal S1 accordingly. In one embodiment, whether "the upper-gate switch U1 is turned OFF by the upper-gate operation signal UG (U1 is OFF)" can be determined according to, for example but not limited to, a complementary signal UGN of the upper-gate operation signal UG.

In other words, when the upper-gate switch U1 is turned OFF by the upper-gate operation signal UG in normal operation, the switching node voltage VLX should not be greater than the drain-source voltage across the lower-gate switch L1. Therefore, if "U1 is OFF" and "VLX>Vth1" are both true, it indicates that an overvoltage event is occurring and there is very likely a short circuit event occurring in the upper-gate switch U1. Under such situation, the logic unit 272 should instantly output the protection signal S1.

Figure 4:
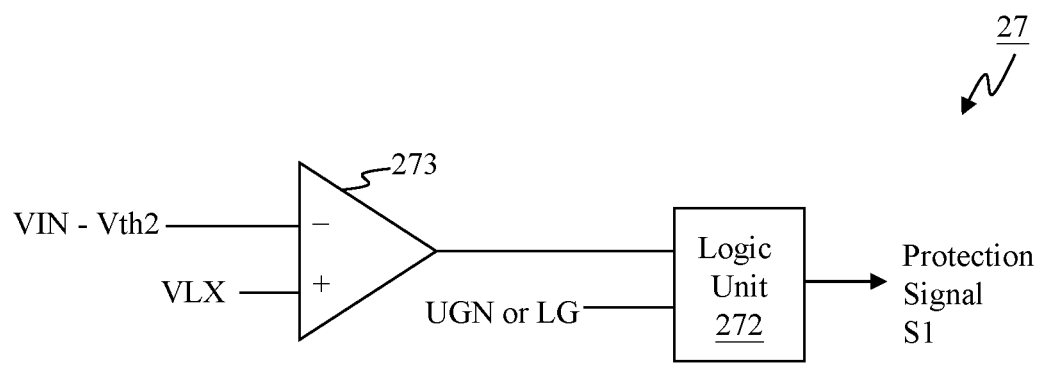
FIG. 4 shows a schematic diagram of an overvoltage sensing unit according to another embodiment of the present invention.

Please refer to FIG. 4, which shows a schematic diagram of an overvoltage sensing unit according to another embodiment of the present invention. The overvoltage sensing unit 27 of this embodiment includes: a comparison circuit 273 and a logic unit 272. Note that, in the present invention, the overvoltage sensing unit 27 directly senses the switching node voltage VLX to determine whether an overvoltage event occurs, which is different from the prior art which directly senses the output voltage VOUT at the output terminal OUT. In this embodiment, the comparison circuit 273 is configured to operably compare the switching node voltage VLX with "a difference between the input voltage VIN and a voltage threshold Vth2", to determine whether the switching node voltage VLX is greater than "the difference between the input voltage VIN and the voltage threshold Vth2" and output a comparison result.

In one embodiment, when the upper-gate switch U1 is turned ON in normal operation, there is a drain-source voltage across the upper-gate switch U1. Therefore, the voltage threshold Vth2 can be set to be, for example but not limited to, a voltage value which is higher than the drain-source voltage across the upper-gate switch U1.

In one embodiment, the logic unit 272 is configured to operably determine whether "the switching node voltage VLX is greater than 'the difference between the input voltage VIN and the voltage threshold Vth2' (VLX>(VIN−Vth2))" and "the lower-gate switch L1 is turned ON by the lower-gate operation signal LG (L1 is ON)" are both true according to the lower-gate operation signal LG and the comparison result outputted from the comparison circuit 273 (the comparison results shows whether VLX>(VIN−Vth2)). If it is determined yes (i.e., both are true), the logic unit 272 outputs the protection signal S1 accordingly.

In other words, when the lower-gate switch L1 is turned ON by the lower-gate operation signal LG, the switching node voltage VLX should not be greater than (VIN−Vth2). Therefore, if "VLX>(VIN−Vth2)" and "L1 is ON" are both true, it indicates that an overvoltage event is occurring and there is very likely a short circuit event occurring in the upper-gate switch U1. Under such situation, the logic unit 272 should instantly output the protection signal S1.

Please still refer to FIG. 4. The logic unit 272 of this embodiment can determine whether an overvoltage event occurs according to other ways.

In another embodiment, the logic unit 272 is configured to operably determine whether "the switching node voltage VLX is greater than 'the difference between the input voltage VIN and the voltage threshold Vth2' (VLX>(VIN−Vth2))" and "the upper-gate switch U1 is turned OFF by the upper-gate operation signal UG (U1 is OFF)" are both true according to the upper-gate operation signal UG and the comparison result outputted from the comparison circuit 273 (the comparison results shows whether VLX>(VIN−Vth2)). If it is determined yes (i.e., both are true), the logic unit 272 outputs the protection signal S1 accordingly.

In other words, when the upper-gate switch U1 is turned OFF by the upper-gate operation signal UG, the switching node voltage VLX should not be greater than (VIN−Vth2). Therefore, if "VLX>(VIN−Vth2)" and "U1 is OFF" are both true, it indicates that an overvoltage event is occurring and there is very likely a short circuit event occurring in the upper-gate switch U1. Under such situation, the logic unit 272 should instantly output the protection signal S1.

The positive and negative input terminals of the comparison circuit 271 and the comparison circuit 273 are not necessarily arranged as the configuration shown in FIG. 3 and FIG. 4 but are interchangeable, with corresponding amendments of the circuits processing these signals and with corresponding amendments of the related circuits.

In one embodiment, the logic unit 272 shown in FIG. 3 and FIG. 4 can be, for example but not limited to, an AND gate. However, it is well known for those skilled in the art that: if the positive and negative input terminals of the comparison circuit 271 and the comparison circuit 273 are interchanged, or if a complementary signal of the lower-gate operation signal LG is adopted instead of a complementary signal UGN of the upper-gate operation signal UG, or if an upper-gate operation signal UG is adopted instead of the lower-gate operation signal LG, or if the upper-gate switch U1 is replaced with a PMOS power transistor instead of an NMOS power transistor, or if the lower-gate switch L1 is replaced with a PMOS power transistor instead of an NMOS power transistor, or if the meaning of a high level and the meaning of a low level of the signal are interchanged, under all these above-mentioned circumstances, the logic unit 272 may be a different type of logic unit. Those skilled in the art can modify the logic unit 272 according to the logic operations that the logic unit 272 is designed to achieve.

In summary, one of the merits of present invention is that: before power is delivered to the output terminal OUT through the inductor L to cause a damage, the present invention can detect whether there is an undesirable overvoltage event and instantly trigger a coping mechanism to tackle and prevent the problem. On the contrary, in the prior art, the coping mechanism is triggered after an overvoltage event has already occurred in the output voltage VOUT, and after a delayed determination by sensing the output voltage VOUT is performed.

The present invention has been described in considerable detail with reference to certain preferred embodiments thereof. It should be understood that the description is for illustrative purpose, not for limiting the scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch. For another example, the upper-gate switch U1, the lower-gate switch L1 and the supply control switch M1 can be a PMOS power transistor or an NMOS power transistor, with corresponding amendments of the circuits. For still another example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described herein before to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. An overvoltage protection method for providing overvoltage protection to a buck switching regulator, wherein the buck switching regulator is configured to operably convert an input voltage supplied from an input terminal to an output voltage at an output terminal, the buck switching regulator comprising: a power stage, which includes: an upper-gate switch having one end electrically connected to the input terminal and another end electrically connected to a switching node, wherein the upper-gate switch is controlled by an upper-gate operation signal; a lower-gate switch having one end electrically connected to the switching node and another end electrically connected to ground, wherein the lower-gate switch is controlled by a lower-gate operation signal; and an inductor having one end electrically connected to the switching node and another end electrically connected to the output terminal; and a supply control switch, which is configured to operably control transmission of power from the output terminal to a load; the overvoltage protection method comprising the following steps:
   (A) sensing a voltage of the switching node, to obtain a switching node voltage;
   (B) determining whether an overvoltage event occurs in the switching node voltage; and
   (C) when the step (B) determines that an overvoltage event occurs in the switching node voltage, outputting a protection signal.

2. The overvoltage protection method of claim 1, wherein the step (B) includes one of the following steps (B1)-(B4):
   (B1) determining whether the switching node voltage is greater than a first voltage threshold and whether the lower-gate switch is turned ON by the lower-gate operation signal; or
   (B2) determining whether the switching node voltage is greater than the first voltage threshold and whether the upper-gate switch is turned OFF by the upper-gate operation signal; or
   (B3) determining whether the switching node voltage is greater than a difference between "the input voltage and a second voltage threshold" and whether the lower-gate switch is turned ON by the lower-gate operation signal; or
   (B4) determining whether the switching node voltage is greater than a difference between "the input voltage and the second voltage threshold" and whether the upper-gate switch is turned OFF by the upper-gate operation signal.

3. The overvoltage protection method of claim 1, wherein the protection signal triggers one of or a combination of the following actions:
   (1) turning off the supply control switch;
   (2) turning off the upper-gate switch and the lower-gate switch; and/or
   (3) directly shutting down the buck switching regulator.

4. A buck switching regulator having overvoltage protection function, which is configured to operably convert an input voltage supplied from an input terminal to an output voltage at an output terminal, the buck switching regulator comprising:
   a power stage, which includes:
      an upper-gate switch having one end electrically connected to the input terminal and another end electrically connected to a switching node, wherein the upper-gate switch is controlled by an upper-gate operation signal;
      a lower-gate switch having one end electrically connected to the switching node and another end electrically connected to ground, wherein the lower-gate switch is controlled by a lower-gate operation signal; and
      an inductor having one end electrically connected to the switching node and another end electrically connected to the output terminal;
   a supply control switch, which is configured to operably control transmission of power from the output terminal to a load;
   a control signal generation circuit, which is configured to operably generate the upper-gate operation signal and the lower-gate operation signal; and
   an overvoltage sensing unit, which is electrically connected to the switching node and which is configured to operably sense a voltage of the switching node, to obtain a switching node voltage; wherein the overvoltage sensing unit determines whether an overvoltage event occurs in the switching node voltage, and when the overvoltage sensing unit determines that an overvoltage event occurs in the switching node voltage, the overvoltage sensing unit outputs a protection signal.

5. The buck switching regulator having overvoltage protection function of claim 4, wherein the overvoltage sensing unit includes:
   a comparison circuit, which is configured to operably compare the switching node voltage with a voltage threshold, to determine whether the switching node voltage is greater than the voltage threshold and output a comparison result correspondingly; and
   a logic unit, which is configured to operably determine whether to generate the protection signal according to the comparison result and the lower-gate operation signal or according to the comparison result and the upper-gate operation signal.

6. The buck switching regulator having overvoltage protection function of claim 4, wherein the overvoltage sensing unit includes:
   a comparison circuit, which is configured to operably determine whether the switching node voltage is greater than a difference between "the input voltage and a voltage threshold", and output a comparison result correspondingly; and
   a logic unit, which is configured to operably determine whether to generate the protection signal according to the comparison result and the lower-gate operation signal or according to the comparison result and the upper-gate operation signal.

7. The buck switching regulator having overvoltage protection function of claim 4, wherein the protection signal triggers one of or a combination of the following actions:
   (1) turning off the supply control switch;
   (2) turning off the upper-gate switch and the lower-gate switch; and/or
   (3) directly shutting down the buck switching regulator.

8. A control circuit of a buck switching regulator having overvoltage protection function, wherein the buck switching regulator is configured to operably convert an input voltage supplied from an input terminal to an output voltage at an output terminal, the buck switching regulator comprising: a power stage, which includes: an upper-gate switch having one end electrically connected to the input terminal and another end electrically connected to a switching node, wherein the upper-gate switch is controlled by an upper-gate operation signal; a lower-gate switch having one end electrically connected to the switching node and another end electrically connected to ground, wherein the lower-gate switch is controlled by a lower-gate operation signal; and an inductor having one end electrically connected to the switching node and another end electrically connected to the output terminal; and a supply control switch, which is configured to operably control transmission of power from the output terminal to a load; the control circuit comprising:

a control signal generation circuit, which is configured to operably generate the upper-gate operation signal and the lower-gate operation signal, so as to control an operation of the upper-gate switch and an operation of the lower-gate switch, respectively; and an overvoltage sensing unit, which is electrically connected to the switching node and which is configured to operably sense a voltage of the switching node, to obtain a switching node voltage; wherein the overvoltage sensing unit determines whether an overvoltage event occurs in the switching node voltage, and when the overvoltage sensing unit determines that an overvoltage event occurs in the switching node voltage, the overvoltage sensing unit outputs a protection signal.

9. The control circuit of a buck switching regulator having overvoltage protection function of claim 8, wherein the overvoltage sensing unit includes:

a comparison circuit, which is configured to operably compare the switching node voltage with a voltage threshold, to determine whether the switching node voltage is greater than the voltage threshold and output a comparison result correspondingly; and a logic unit, which is configured to operably determine whether to generate the protection signal according to the comparison result and the lower-gate operation signal or according to the comparison result and the upper-gate operation signal.

10. The control circuit of a buck switching regulator having overvoltage protection function of claim 8, wherein the overvoltage sensing unit includes:

a comparison circuit, which is configured to operably determine whether the switching node voltage is greater than a difference between "the input voltage and a voltage threshold", and output a comparison result correspondingly; and a logic unit, which is configured to operably determine whether to generate the protection signal according to the comparison result and the lower-gate operation signal or according to the comparison result and the upper-gate operation signal.

\* \* \* \* \*